United States Patent [19]

Livesay

[11] 4,265,084
[45] May 5, 1981

[54] METHOD AND APPARATUS FOR ASSEMBLY OF A TRACK CHAIN WITH MINIMUM END PLAY

[75] Inventor: Richard E. Livesay, Peoria, Ill.

[73] Assignee: Caterpillar Tractor Co., Peoria, Ill.

[21] Appl. No.: 98,143

[22] PCT Filed: Jul. 16, 1979

[86] PCT No.: PCT/US79/00504

§ 371 Date: Jul. 16, 1981

§ 102(e) Date: Jul.16, 1981

[87] PCT Pub. No.: WO81/00223

PCT Pub. Date: Feb. 5, 1981

[51] Int. Cl.³ .............................................. F16G 13/06
[52] U.S. Cl. ............................................. 59/7; 59/84;
305/11; 305/59; 474/223; 474/230
[58] Field of Search ............... 59/7, 11, 35, 78, 84;
305/11, 14, 59; 29/525; 74/251 R, 251 C, 254, 247

[56] References Cited

U.S. PATENT DOCUMENTS

| 1,946,911 | 2/1934 | Lindberg | 59/7 |
|---|---|---|---|
| 3,028,723 | 4/1962 | Kaplan | 59/7 |
| 3,075,346 | 1/1963 | Quarve | 59/7 |
| 3,097,477 | 7/1963 | Rodgers | 59/7 |
| 3,302,388 | 2/1967 | Gentsch | 59/8 |
| 3,939,648 | 2/1976 | Cullen | 59/11 |
| 4,027,471 | 6/1977 | Lipp | 59/7 |
| 4,150,856 | 4/1979 | Hakkenberg | 305/11 |
| 4,163,589 | 8/1979 | Fox | 305/14 |

FOREIGN PATENT DOCUMENTS 16432 12/1955 Fed. Rep. of Germany ............... 59/7

Primary Examiner—Lowell A. Larson
Assistant Examiner—Gene P. Crosby
Attorney, Agent, or Firm—Oscar G. Pence

[57] ABSTRACT

A method and apparatus for assembling an articulated track chain (10) affording controlled minimum end play, the chain (10) comprising a plurality of coacting, overlapping pairs of oppositely disposed links (20,22,24,26) having integral interconnecting pin and sprocket engaging members (16,18). An apparatus (122,124) for locating the coacting, overlapping pairs of links (20,22,24,26) at a preselected position on the pin (16,18), regardless of the variations in the link thickness due to manufacturing tolerances is disclosed.

16 Claims, 4 Drawing Figures

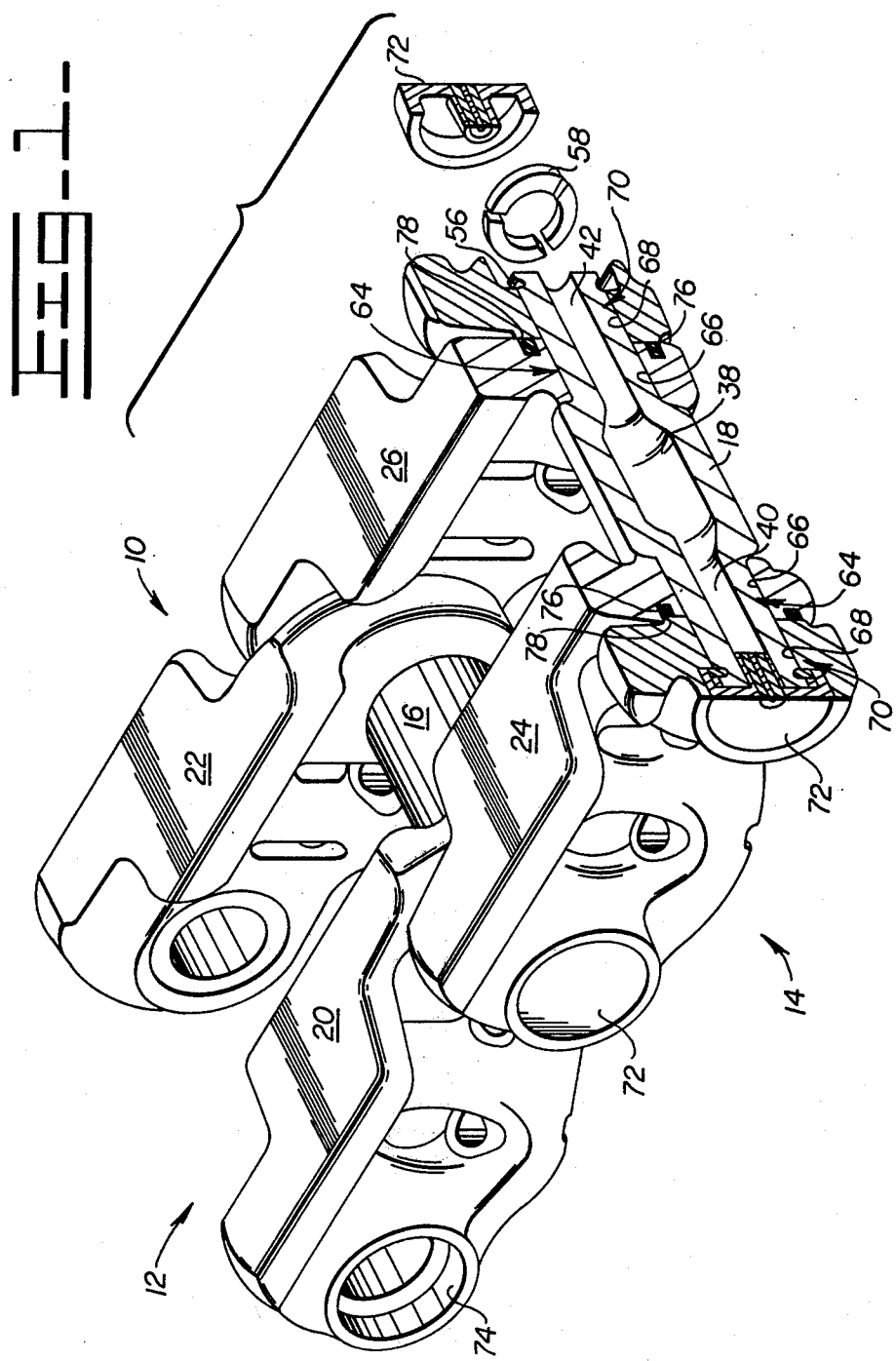

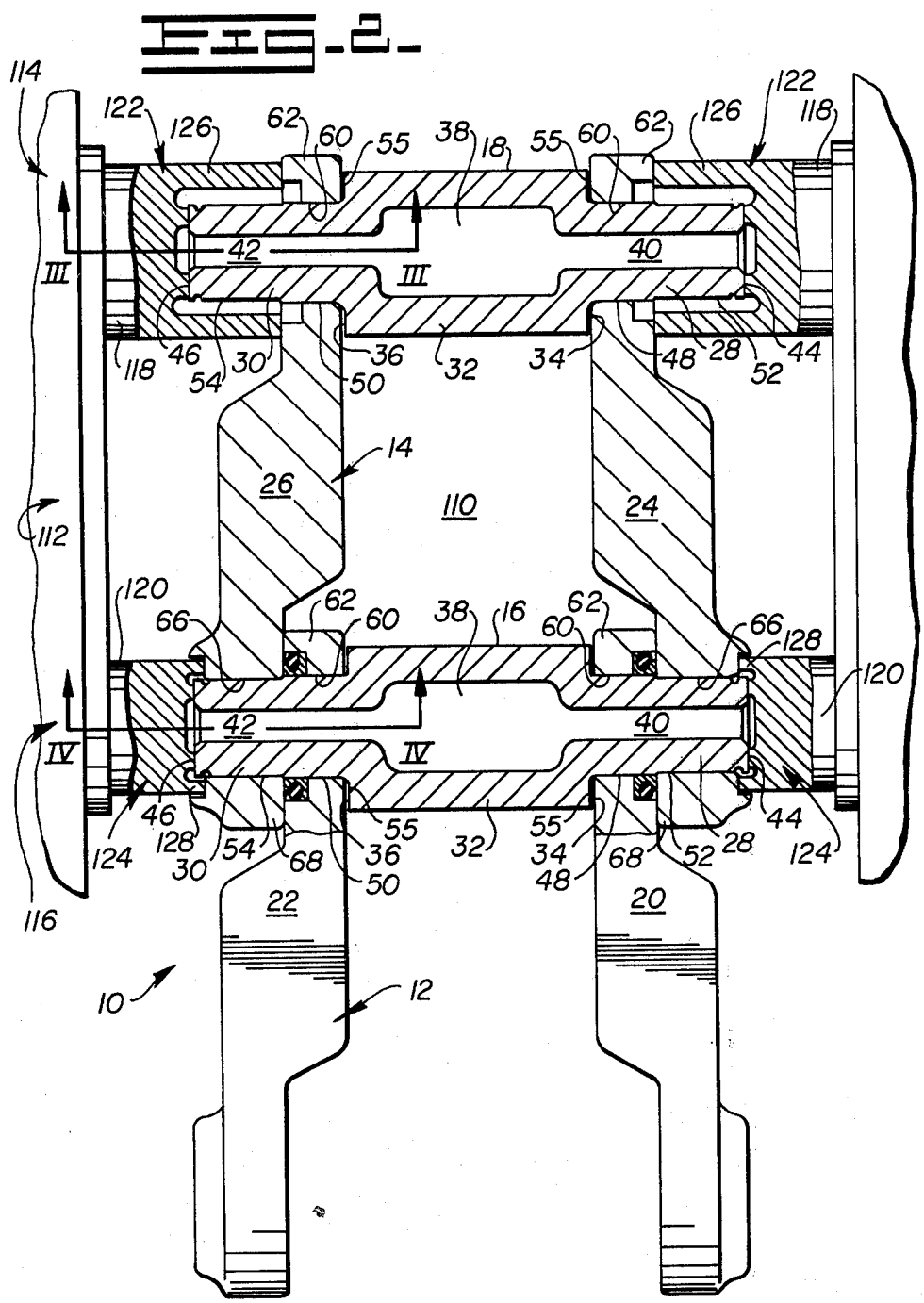

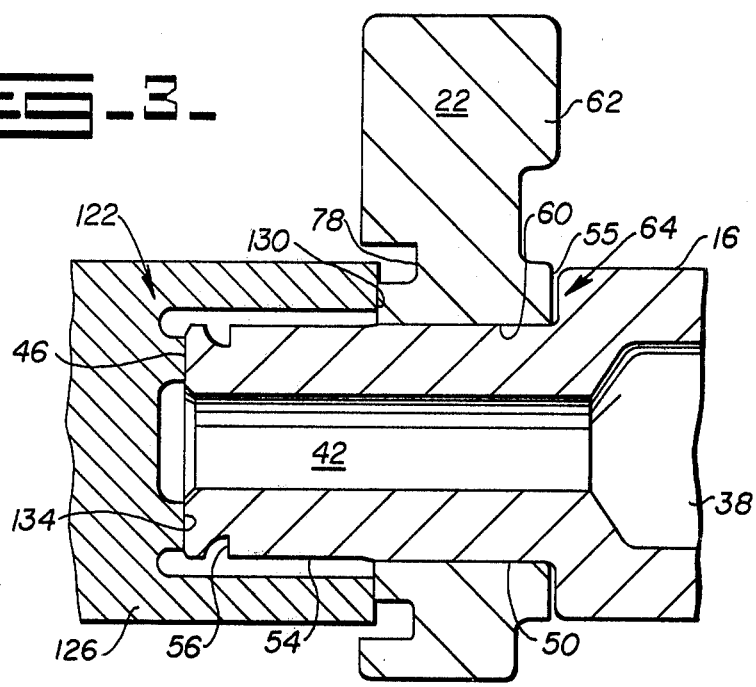
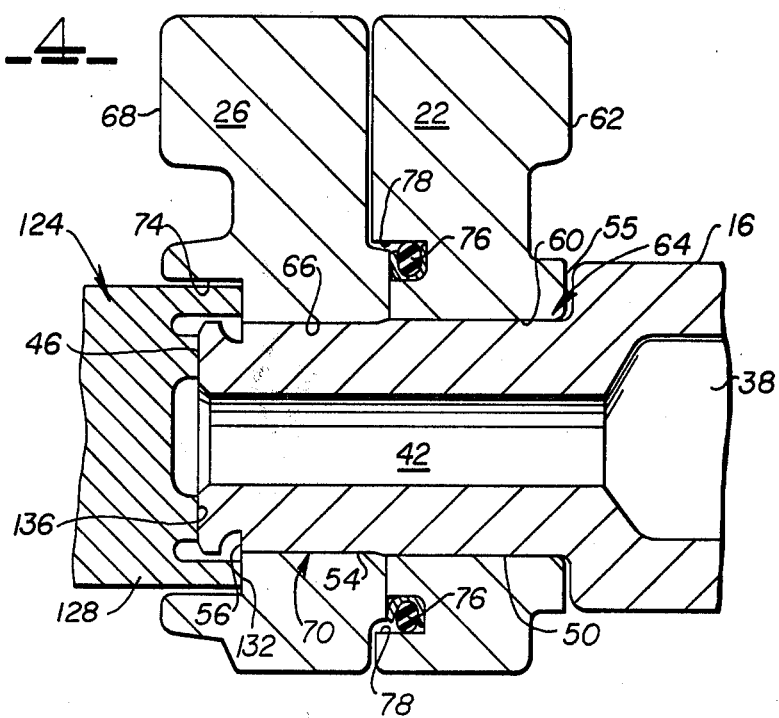

METHOD AND APPARATUS FOR ASSEMBLY OF A TRACK CHAIN WITH MINIMUM END PLAY

DESCRIPTION

1. Technical Field

This invention relates to a method and apparatus for assembling an articulated chain. More specifically, but without restriction to the use which is shown and described, this invention relates to a method and apparatus for assembling an articulated track chain comprising coacting pairs of oppositely disposed links having integral interconnecting pin and sprocket engaging portion affording minimum end play.

2. Background Art

Conventional joints in track chains adapted for use in the track assemblies of track type vehicles comprise pin and bushing subassemblies having a sprocket engaging bushing and include a first pair of links pressed thereon, a pin rotatably disposed within the bushing, and a second adjacent pair of links pressed onto the opposite ends of the pin. Typically, track chains are assembled by multi-station track presses such as disclosed in U.S. Pat. No. 1,946,911 issued to Lindburg et al., Feb. 13, 1934, and in U.S. Pat. No. 3,028,723 issued to Kaplan et al., Apr. 10, 1962. The track presses include retractable rams for simultaneously pressing adjacent, overlapping link pairs onto adjacent pin and bushing subassemblies and means for sequentially moving the assembly a preselected distance from one station to the next.

The assembly of track chains has presented a number of problems, the most severe of which is the difficulty of aligning and pressing the parts of a link to assemble them with each other and with previously assembled portions of the chain without introducing bending moments in the chain or damage to the parts. This problem has been successfully addressed by U.S. Pat. No. 4,027,471 issued to Lipp et al., June 7, 1977, and assigned to the assignee of the present invention wherein there is provided a method and apparatus for semiautomatically assembling a track chain of the conventional type without introducing bending moments or component damage therein.

Recent developments in track chain technology include the introduction of wider link rails, integral pin and sprocket engaging bushing means, and improved seal designs for sealing lubricant at the link-pin joints. For example, U.S. Pat. No. 4,150,856 issued to Hakkenberg et al., Apr. 24, 1979, also assigned to the assignee of the present invention, discloses a track pin including an integral intermediate sprocket engaging portion. The ends of a first pair of oppositely disposed, inner links are pressed onto the ends of the pin adjacent the intermediate portion. The ends of an associated pair of links are pivotally connected to the ends of the pin immediately adjacent to and outwardly from the first pair of links and held thereon by a suitable retainer, for example, a shear ring. Lubricant is retained within a lubricant-receiving cavity and at the link-pin joint by annular seal means disposed between the associated link pairs and by an end cap fitted over the end of the pin.

The assembly of a track chain of this design poses not only the traditional problems discussed earlier, but further introduces the problem of controlling the link end play within acceptable limits. Link end play is the amount of movement of a link along the longitudinal axis of the pin during operation of the track. It is an important parameter from the standpoints of wear and sealing effectiveness. For example, if the end play is too great, excessive wear of the pin will result and the link pin bore will become bellmouthed. A more serious problem associated with excessive end play is the reduction of sealing effectiveness at the inner link-seal interface. Track joint seals are effective only over a limited gap range at the interface. If the gap is too great due to excessive end play, the resultant loss of lubricant will cause damage to the joint and a premature failure of the track chain and excessive vehicle down time.

On the other hand, if there is no end play of the outwardly disposed link ends, the joint will be too tight, causing binding and excessive wear between the link faces, possible damage to the shear ring, and, again, premature failure of the track chain. These problems are further aggravated by the thickness tolerances of the ends of the adjacent links and the dimensional tolerances between the end face of the pin, the shear ring groove, and the shoulder of the intermediate sprocket engaging portion.

End play may be reduced by tightening up the dimensional tolerances of the track chain components by precision machining the link ends, the end face of the pin, the shear ring groove, and the intermediate shoulder portion. The end play also may be set by pulling the links back off the pin up against the shear ring after complete assembly of each respective joint. However, both of these alternatives entail additional operations and tooling and add to the cost of the track chain.

In view of the above, it would be advantageous to provide a method and apparatus for assembling the components of a track chain without introducing bending moments in the previously assembled portions of the chain or damage in the components and with end play closely controlled within preselected limits regardless of the manufacturing tolerances of the components.

DISCLOSURE OF THE INVENTION

In one aspect of the present invention, the problems pertaining to the known prior art, as set forth above, are advantageously avoided. This is accomplished by providing a method for assembling a joint which includes pressing a first member a first preselected distance onto a pin; urging a second member onto the pin adjacent the first member and simultaneously pressing the first member with the second member onto the pin to a second preselected distance; and installing retaining means onto the pin.

In another aspect of the present invention, an apparatus for assembling a joint including first and second members operatively connected adjacent one another to a pin having an axis and an end face perpendicular to the axis, includes body portions positionable along the pin, stops for engaging the end face of the pin, and locators for positioning the first and second members a preselected distance from the end face of the pin in response to the stops engaging the pin end face.

In the assembly of a track chain including a plurality of spaced apart, overlapping pairs of links, each link having a press end and a bearing end operatively connected to a pin and retained thereon by a shear ring disposed in a groove, the link end play is set to a predetermined minimum distance by pressing the press end of a first link onto a pin a preselected distance from the shear ring groove equal to the nominal thickness of the bearing end of a link. The bearing end of a second link is urged onto the pin past the shear ring groove a distance equal to the preselected minimum end play distance. If the bearing end of the second link is undersize, the first link will be further pressed onto the pin a distance equal to the difference between the preselected minimum end play distance and the amount of the second link thickness undersize. If the bearing end of the second link is nominal, the first link will be further pressed onto the pin a distance equal to the preselected minimum end play distance, and, if the bearing end of the second link is oversize, the first link will be further pressed onto the pin a distance equal to the sum of the preselected minimum end play distance plus the amount of the second link thickness oversize. The final running end play, therefore, is set to a predetermined minimum regardless of variations in the dimensions of the track joint elements.

BRIEF DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is an isometric view in partial section of a portion of an articulated chain;

FIG. 2 is a horizontal profile view of an embodiment of the present invention with portions removed to better illustrate the components thereof;

FIG. 3 is a vertical sectional view taken along line III—III of FIG. 2; and

FIG. 4 is a vertical sectional view taken along line IV—IV of FIG. 2.

BEST MODE FOR CARRYING OUT THE INVENTION

Referring to FIGS. 1 and 2, there is shown a portion of a partially assembled chain 10 comprising a plurality of overlapping, pivotally interconnected, adjacent link pairs 12,14 interconnected by a plurality of pins 16,18.

Each link pair 12,14 includes a first and a second link 20,22 and 24,26, each link being interconnected with each other and with one of the links of an adjacent link pair by one of the pins 16,18. Each pin includes first and second oppositely disposed reduced diameter end portions or link mounting ends 28,30, an enlarged diameter midportion or sprocket engaging portion 32 disposed intermediate the ends and separated therefrom by a first and a second shoulder 34,36, a lubricant-receiving reservoir 38, and a passage 40,42 extending from the reservoir to the ends of the pin for communicating lubricant thereto. Each link mounting end includes an end face 44,46, a press portion 48,50 extending outwardly from the shoulder a preselected distance, and a bearing portion 52,54 slightly smaller in diameter than the press portion, extending therefrom to the end face of the pin. A groove 56 is formed circumferentially about each end of the pin member a preselected distance from each of the end faces for receiving a link retaining or shear ring assembly 58 after assembly of the links thereon. The distance between the end faces 44,46 and the respective shoulder portions 34,36 is preselected to accommodate the ends of adjacent links regardless of variations in their thicknesses, thereby leaving a variable gap 55 between the inwardly mounted link and each shoulder.

Each link 20,22,24,26 has a press bore 60 extending through a respective press end 62 thereof adapted to receive the press portion 48,50 of a pin 16,18 in a press fit of relatively close tolerance designed to provide an essentially rigid joint 64 between the link and the pin. Similarly, a bearing bore 66 is formed in the respective other or bearing end 68 of each link for receiving the bearing portion 52,54 of a pin in a close tolerance fit forming an articulated joint 70 which allows each link to rotate about the pin. The links have a stepped configuration which permits overlapping and coaxial alignment of the press bore of one link and the bearing bore of an adjacent link, the bearing end of one link disposed outwardly from the press end of an adjacent link, thereby permitting articulation between the adjacent pairs of links.

An end cap 72 is pressed in a counter bore 74 on the bearing end 68 of each link to prevent the egress of lubricant therefrom and the ingress of dirt into the joint. A seal 76 disposed in an annular recess 78 formed circumferentially about the press bore 60 of each link and in sealing engagement with the bearing end of the adjacent link cooperates with the end cap in preventing egress of lubricant from the articulated joints.

As illustrated in FIG. 2, adjacent link pairs 12,14 are shown at a work station 110. The work station comprises a multi-head press 112 of the type well-known in the art, first and second assembly points 114,116, and means (not shown) for indexing the chain from the first assembly point to the second assembly point. The press includes first and second oppositely disposed, coaxial rams 118,120 located at the first and second assembly points 114,116 respectively.

As illustrated in FIG. 2 and shown in greater detail in FIGS. 3 and 4, each ram 118,120 has a pair of heads 122,124 affixed thereto for pressibly engaging portions of the chain 10. Each head respectively includes a body portion 126,128 adapted to be positioned along a pin 16,18, a locating portion 130,132 for engaging a link and locating it at a preselected position on a pin, and a stop portion 134,136 for registering with an end face 44,46 of the pin cooperating with the locating portion in locating the link at the preselected position on the pin. The stop portions are formed on each head so as to be free from contact with the passages 40,42 when in registry with the end face to prevent damage thereto.

INDUSTRIAL APPLICABILITY

In the assembly of the track chain 10 according to the teaching of the present invention, the first pin 16 is positioned at the first assembly point 114 on the work station 110 coaxially aligned with and disposed intermediate the heads 122 of the first ram 118. The first and second links 20 and 22 are positioned intermediate the first and second link mounting ends 28 and 30 of the pin, respectively, and the heads of the ram, with the press bores 60 being coaxially aligned with the pin. Actuation of the multihead press 112 and the first ram causes the heads to move toward each other bringing the locating portions 130 of each head into engagement with the links 20 and 22, respectively. The links are urged by the heads onto the bearing portions 52,54 of the pin 16 and are thereafter pressed onto the respective press portions 48,50 until the stop portions 134 on the heads 122 register with the end faces 44,46 of the pin, as shown in FIG. 2. The distance between the stop portion 134 and the locating portion 130 of each head is selected to be equal to the nominal thickness of the bearing end 68 of each link plus the preselected distance between the ring groove 56 and the respective end face 44,46 of the pin.

Therefore, the press end 62 of each link is positioned a preselected distance equal to the nominal thickness of the bearing end 68 from the groove 56.

Upon completion of the press, the ram 118 retracts to its initial position, and the indexing means (not shown) moves the first pin 16 and the links 20,22 from the first assembly point 114 a distance equal to the pitch of the chain 10 to the second assembly point 116 where the first pin is coaxially aligned with and disposed between the heads 124 of the second ram 120. The seal 76 is then inserted in the recess 78 formed about the press bore 60 in each of the links and the second pin 18 and the third and fourth links 24 and 26 are positioned in alignment for assembly on the work station with their press bores 60 coaxially aligned with the second pin at the first assembly point 114 and with their bearing bores 66 coaxially aligned with the first pin at the second assembly point 116. Actuation of the multi-head press 112 repeats the assembly procedure at the first assembly point 114 as hereinbefore described.

Simultaneously, at the second assembly point 116, actuation of the multi-head press 112 and the second ram 120 causes the heads 124 to move toward each other and to bring the locating portion 132 of each head into engagement with the third and fourth links 34 and 26. The third and fourth links are urged onto the bearing portions 52 and 54 of the first pin 16 and into contact with the press ends 62 of the first and second links 20 and 22 until the stop portions 136 on the heads 124 register with the end face portions 44 and 46 of the first pin, as shown in greater detail in FIG. 4. The distance between the stop portion 136 and the locating portion 132 of each head 124 at the second assembly point 116 is preselected to position the bearing end 68 of each of the third and fourth links 24 and 26 a distance equal to the desired minimum end play distance from the shear ring groove 56.

Typically, the thickness tolerance of the bearing end 68 of each link is in the range of ±0.254 mm (0.010″), preferably approximately ±0.127 mm (0.005″). If the desired preselected minimum end play distance is set to equal the bearing end thickness tolerance, for example 0.127 mm, it can be seen that if the bearing end is undersize, the adjacent link will be further pressed onto the press portion 48,50 a distance equal to the difference between the preselected minimum end play distance and the amount of the link thickness undersize. If the bearing end of the link is nominal, the adjacent link will be further pressed onto the press portion a distance equal to the preselected end play distance, and, if the bearing end of the link is oversize, the adjacent link will be further pressed onto the press portion a distance equal to the sum of the preselected end play distance plus the amount of the link thickness oversize.

At this point, the rams 118 and 120 return to their inactive initial position. The partially assembled chain is again indexed and the process is repeated until a chain of the desired length is formed. At subsequent work stations, a shear ring assembly 58 is installed in each of the shear ring grooves 56, lubricant is added to the reservoir 38 via the passages 40 and 42, and end caps 72 are installed in the counter bores 74 formed in the bearing ends of each link, thus completing assembly of the chain with controlled minimum endplay.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

I claim:

1. A method of assembling a joint comprising:
   Step (a) pressing a first member (20) a first preselected distance onto one of first and second ends (28,30) of a pin (16);
   Step (b) urging a second member (24) onto the pin (16) adjacent the first member (20) and simultaneously pressing the first member (20) with the second member (24) onto the pin (16) to a second preselected distance; and
   Step (c) installing retaining means (58) onto the pin (16) and permitting free pivotal movement of the second member (24) on the pin (16).

2. The method of claim 1 including Step (d) pressing a third member (22) onto the other end of the pin (16) a distance substantially the same as the first preselected distance during Step (a).

3. The method of claim 2 including Step (e) urging a fourth member (26) onto the other end of the pin (16) adjacent the third member (22) and pressing the third member (22) with the fourth member (26) onto the pin (16) a distance substantially the same as the second preselected distance during Step (b).

4. The method of claim 3 including Step (f) installing retaining means (58) on the other end of the pin (16).

5. The method of claim 1 wherein Step (b) includes pressing the second member (24) onto a second pin (18).

6. The method of claim 3 wherein Step (e) includes pressing the fourth member (26) onto a second pin (18).

7. A method of assembling a chain (10) including a plurality of interconnected links (20,22,24,26) articulately joined by pin means (16,18), the method comprising:
   Step (a) pressing a first link (20) a first preselected distance onto one of first and second ends (28,30) of a pin (16);
   Step (b) urging a second link (24) onto said pin (16) adjacent the first link (20) and simultaneously pressing the first link (20) onto the pin (16) with the second link (24) to a second preselected distance; and
   Step (c) installing retaining means (58) onto the pin (16) and permitting free pivotal movement of the second member (24) on the pin (16).

8. The method of claim 7 wherein Step (b) includes pressing the second link (24) onto a second pin (18) a distance substantially the same as the first preselected distance during Step (a).

9. The method of claim 8 including Step (d) urging a third link (22) onto the other end of the pin (16) a distance substantially the same as the first preselected distance during Step (a).

10. The method of claim 9 including Step (e) urging a fourth link (26) onto the other end of the pin (16) adjacent the third link (22) and pressing the third link (22) with the fourth link (26) onto the pin (16) a distance substantially the same as the second preselected distance during Step (b).

11. The method of claim 10 including Step (f) installing retaining means (58) on the other end of the pin (16).

12. The method of claim 10 wherein Step (e) includes pressing the fourth link (26) onto a second pin (18).

13. A method of assembling a track chain (10) including a plurality of articulately interconnected link pairs (12,14) having first and second laterally spaced links (20,22,24,26) operatively connected to pin means (16,18), the method comprising:

Step (a) pressing a first pair (12) of links (20,22) onto opposite ends (28,30) of a pin (16) a first preselected distance;

Step (b) urging a second pair (14) of links (24,26) onto the opposite ends (28,30) of the pin (16) and simultaneously pressing the first pair (12) of links (20,22) onto the pin (16) to a second preselected distance; and Step (c) installing retaining means (58) onto the pin ends (28,30) and permitting free pivotal movement of the second pair (14) of links (24,26) on the pin (16).

14. The method of claim 13 wherein Step (b) includes pressing the second pair (14) of links (24,26) onto the opposite ends (28,30) of a second pin (18) to a distance substantially the same as the first preselected distance during Step (a).

15. An apparatus for assembling a joint (64,70) including a first member (20) and a second member (24) operatively connected adjacent one another to a pin (16,18) having an axis and an end face portion (44,46) disposed substantially perpendicular to the axis comprising:

means (122) for positioning the first member (20) on the pin (16,18) said means (122) including a body portion (126) positionable along the pin (16,18);

a stop portion (134) for engaging the end face (44,46) of the pin (16,18);

a locating portion (130,132) engageable with the first member (20) for positioning the first member (20) a preselected distance from the end face (44) of the pin (16,18) in response to said stop portion (134) engaging said end face (44);

means (124) for positioning the first and second members (20,24) on the pin (16,18) said positioning means (124) having a body portion (128) positionable along the pin (16,18);

a second stop portion (136) for engaging the end face portion (44,46) of the pin (16,18); and a locating member (132) engageable with the second member (24) for positioning the first and the second members (20,24) a preselected distance from the end face (44,46) of the pin (16,18) in response to said second stop portion (136) engaging said end face (44,46).

16. The apparatus of claim 15 wherein a lubricant receiving opening (40,42) is formed in the end face (44,46) of the pin (16,18) and the stop portions (134,136) are free from contact therewith.

* * * * *